(12) United States Patent
Carawan

(10) Patent No.: US 6,203,592 B1
(45) Date of Patent: Mar. 20, 2001

(54) FILTER MEDIA CONFIGURATION

(75) Inventor: Paul Carawan, Gastonia, NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/294,144

(22) Filed: Apr. 20, 1999

(51) Int. Cl.[7] .......................... B01D 29/52; B01D 29/56; B01D 29/05
(52) U.S. Cl. .................. 55/484; 55/486; 55/489; 55/500; 55/511; 55/525; 55/528; 55/DIG. 31
(58) Field of Search .................. 55/385.3, 486, 55/489, 480, 481, 482, 483, 484, 511, DIG. 31, 525, 522, 528, 500

(56) References Cited

U.S. PATENT DOCUMENTS

| | | |
|---|---|---|
| 1,841,250 * | 1/1932 | Merryweather ........................ 55/481 |
| 2,130,107 * | 9/1938 | Somers .................................... 55/484 |
| 2,130,806 * | 9/1938 | Link ........................................ 55/484 |
| 2,286,479 | 6/1942 | Farr . |
| 2,567,030 | 9/1951 | Schaaf . |
| 2,764,257 | 9/1956 | Brixius . |
| 3,871,849 * | 3/1975 | Smith et al. ........................... 55/484 |
| 4,334,899 | 6/1982 | McConnell . |

* cited by examiner

Primary Examiner—David A. Simmons
Assistant Examiner—Robert Hopkins
(74) Attorney, Agent, or Firm—Millen, White, Zelano & Branigan, P.C.

(57) ABSTRACT

A filter element includes a filter media having an array of filter media panel members which are oriented at an angle of about 45° with respect to the air stream and are spaced so that the upstream edges of the panels overlap the downstream edges. Consequently, the air stream must pass through two panel members before exiting the filter element. The filter element may also include a secondary filter media in the form of a mat disposed over the downstream edges of the panel members. The filter element is used for filtering cabin air for vehicles or for other similar purposes as well as for filtering engine combustion air.

23 Claims, 3 Drawing Sheets

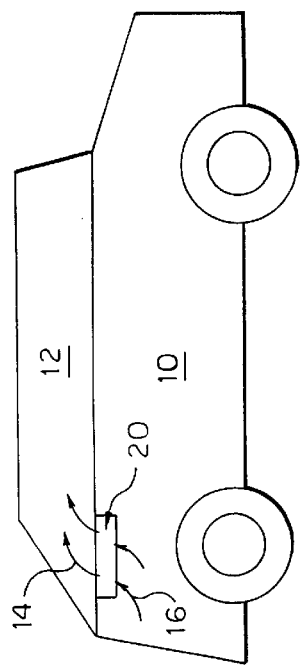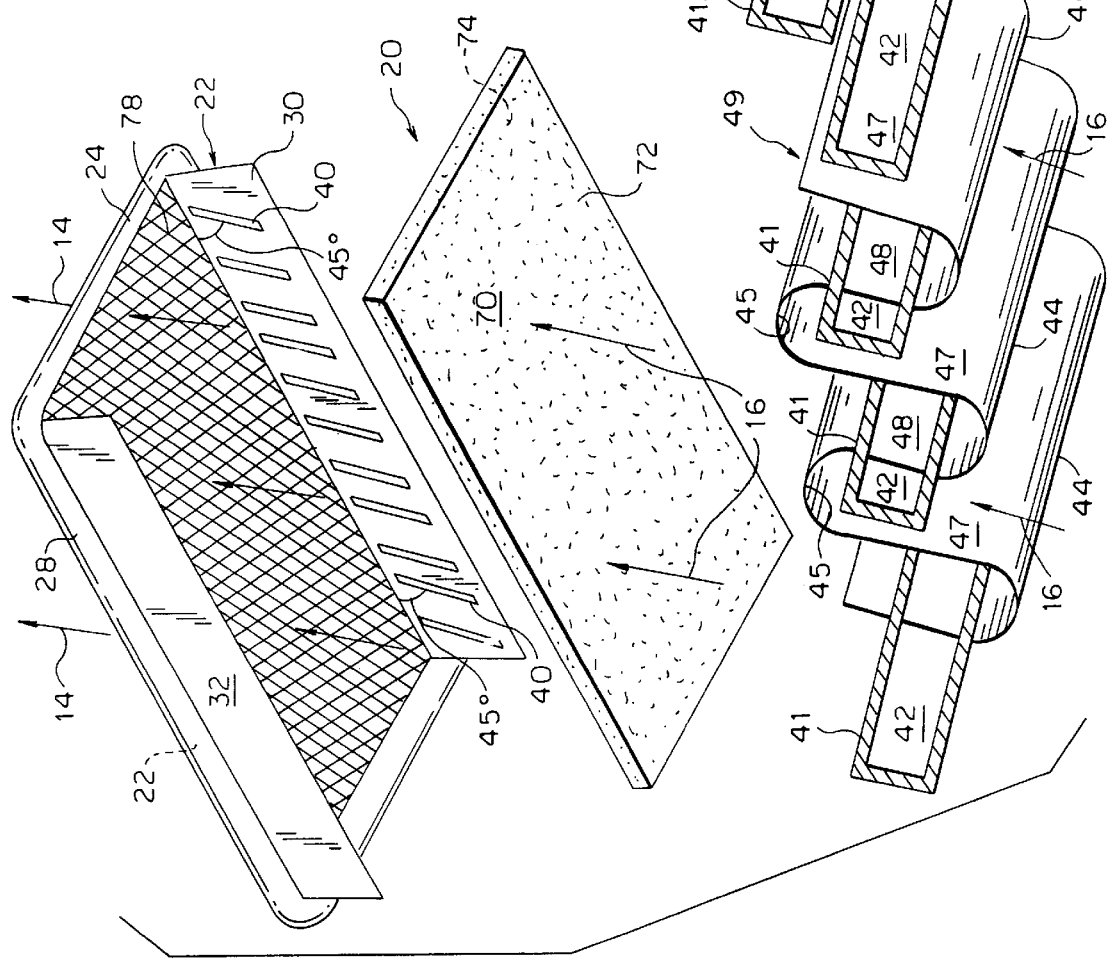

FILTER MEDIA CONFIGURATION

FIELD OF THE INVENTION

The present invention relates to a filter media configuration useful in filtering a fluid, such as, for example, air or a gas in order to remove particulates and other impurities therefrom. More particularly, such a filter media configuration has air filtering systems used to remove contaminants from vehicular cabin air or from air in other enclosures.

BACKGROUND OF THE INVENTION

It has become increasingly desirable and, in some situations necessary, to filter air streams such as air streams which provide "cabin air" for vehicular passenger compartments. This is because vehicles tend to operate in environments which are frequently heavily polluted by emissions from other vehicles traveling on the same roadway, which emissions include a host of injurious gases, vapors and particles. This is not only the case for urban roads, but also for rural roads where pollen and dust are frequently drawn onto roadways by moving vehicles and then pulled into passenger compartments.

Filtering inlet air for vehicular cabins is a relatively new practice in which the technology is now developing and thus, there is a need for concepts which are of particular interest with respect to this technology. The concepts developed to improve the quality of cabin air also may have application for treating air streams in general and specifically, for cleaning combustion air prior to the air entering an internal combustion engine.

SUMMARY OF THE INVENTION

In view of the aforementioned considerations, it is a feature of the present invention to provide a new and improved filter media configuration which is especially useful to clean cabin air for vehicles but which may have other uses such as, for example, removing particulates from air streams used for various purposes such as, for example, but not limited to, air for other living or industrial enclosures or for combustion air used in internal combustion engines.

In view of these features and other features, the present invention is directed to a filter media configuration for a filter element having a frame wherein the filter media filters a stream of gas moving transversely with respect to an opening in the frame in which the filter media is disposed in order to remove particulates from the stream. The filter media comprises an array of filter media panel members having upstream and downstream filter media faces defined within first and second ends and upstream and downstream edges. The filter media panel members are supported in the frame at an angle with respect to the air stream and with a spacing sufficient to overlap upstream edges of filter media panels with the downstream edges of adjacent filter media panel members, whereby air impinging on one filter media panel member and passing therethrough in the direction of the air stream impinges on, and passes through, another filter media panel member before exiting the filter media. In a further aspect, the filter media includes a secondary filter media component disposed downstream of the array of filter media panels.

In a further aspect of the invention, each of the filter media panel members comprises a folded over web of a pleated filter media material, the web being continuously pleated over its length into a plurality of pleats.

In an additional aspect, the filter media panels are oriented at an angle of about 45° with respect to the direction of the air stream.

In a further aspect of the invention, the filter media is incorporated in a filter element which includes a frame that provides the supports to orient the filter media panels at an angle with respect to the air stream as well as a support for the secondary filter media.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 1 is a side schematic view showing a filter element configured in accordance with the principles of the present invention installed to filter cabin air of a vehicle;

FIG. 2 is an exploded, perspective view of one embodiment of a filter element configured in accordance with the principles of the present invention;

DETAILED DESCRIPTION

Figure 3:
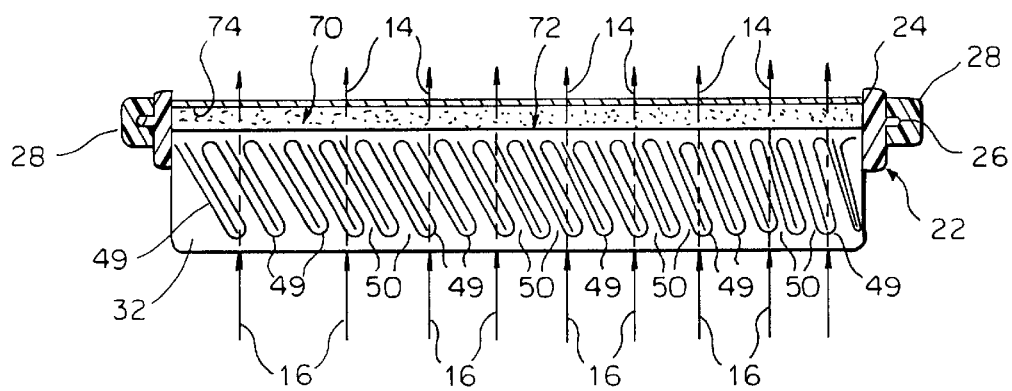
FIG. 3 is a side elevation of the filter element of FIGS. 1 and 2 showing a stream of air impinging on the filter element.
Figure 4:
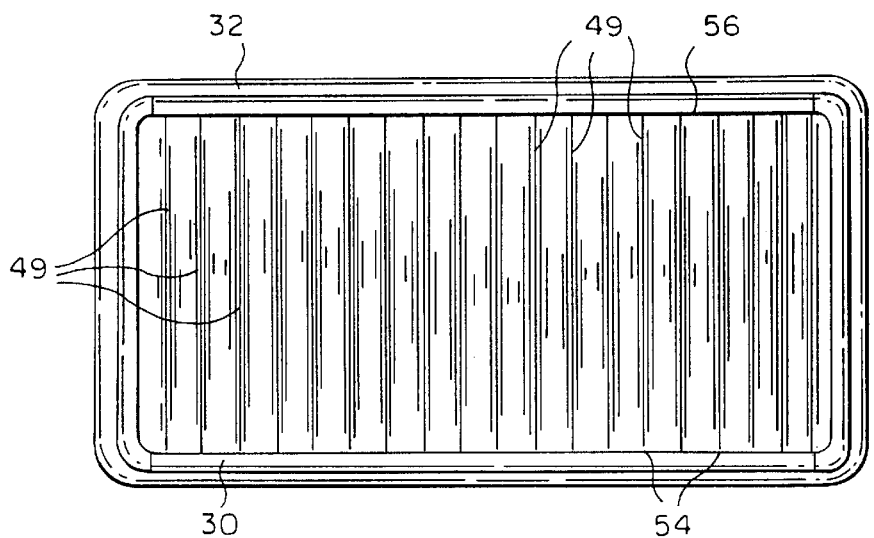
FIG. 4 is a front face view of the filter element of FIGS. 1–3.

Referring now to FIG. 1, there is shown a vehicle 10 having a cabin space 12 which receives cleaned, fresh air 14 which has been filtered from a stream of environmental air 16 and passed through a filter element 20, which filter element is configured in accordance with the principles of the present invention. Filter element 20 is illustrated as being used for the particular purpose of cleaning environmental air 14. The filter element 20 may be used for other purposes such as cleaning air for other enclosures, such as living spaces and industrial spaces. In addition, the filter element 20 may be used for filtering combustion air for internal combustion engines and the like.

Referring now to FIGS. 2–5, it is seen that the filter element 20 includes a rectangular peripheral frame 22 made of nylon or a similar material. Although the frame 22 is shown as being rectangular, the frame may have any shape such as square, circular, oval or some other configuration. The frame comprises peripheral portion 24 which extends completely around the frame and has a projecting lip 26 extending completely therearound which has thereover a U-shaped gasket 28. The U-shaped gasket 28 seals with a housing (not shown) which supports the filter element 20.

The frame 22 has a pair of side flanges 30 and 32 which are spaced apart and define open end portions 34 and 36. Each of the side flanges 30 and 32 have slanted grooves 40 therein which open toward one another. Positioned in the grooves is an array filter media support frames 41 which define openings 42. A web 43 of filter media material is folded over the frames 41 with peaks 44 disposed at the upstream side of the filter element 20 and valleys 45 disposed at the downstream side of the filter element. The frames 41 are disposed in spaces 46 between upstream and downstream panels 47 and 48 defined between each peak 44 and adjacent valleys of the folded web 43. The juxtaposed panels 47 and 48 cooperate to form a filter media panel member 49. The filter media panel members 49 are separated from one another by gaps 50 which extend obliquely with respect to the direction of air flow 16. Each of the filter media panels 49 has an upstream face and a downstream face which are defined within first and second ends 54 and 56 that are adjacent to the slots 40 in the flanges 30 and 32, defined between the peaks 44 and valleys 45, respectively.

As is seen in FIG. 3, when viewed from the direction of the air stream 16, the upstream peaks 44 of each filter element panel member 49 overlap the downstream valleys 45 of the adjacent filter element panel members 49. Consequently, air moving in the direction of the air stream 16 must pass through two panel members 49 before exiting from the array of panel members 49. Preferably, the slots 40 are disposed at about 45° angle with respect to the direction of the air stream 16 so as to orient the filter media panel members 49 at about 45° with respect to the air stream 16 and thus ensure that particles flowing in the direction of the air stream are intercepted by at least two air filter media panel members.

Figure 6:
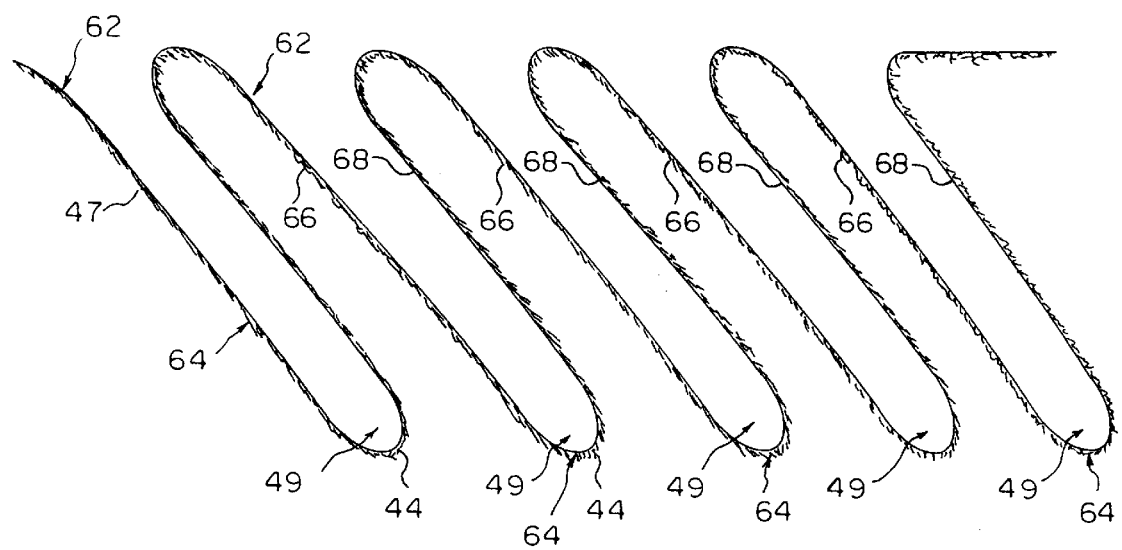
FIG. 6 is an enlarged side view of the filter media embodiment used with the filter element of FIG. 1.

Referring now mainly to FIG. 6, the filter media web 43 is made of any appropriate filter media material. For example, the filter media web 43 can be configured of filter paper, cellulose, a non-woven synthetic material such as polyester fiber, or a metal mesh or screen. Accordingly, the filter media may either be disposable or cleanable and reusable. A preferable configuration for the filter media web is a paper substrate 62 forming a backing for a non-woven mat of polyester fibers 64. By passing through two filter media panel members 49 before exiting the filter media material comprising the filter media web 43, the air stream 16 passes through four separate panels of filter media material. This is because each filter media panel member 49 is itself comprised of an upstream panel 66 and a downstream panel 68.

Figure 5:
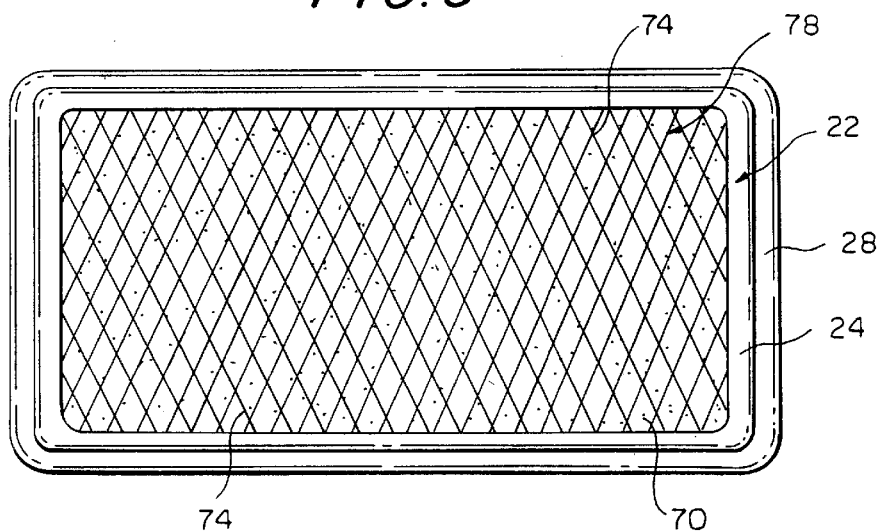
FIG. 5 is a rear face view of the filter element of FIGS. 1–3.

Referring now to FIGS. 2, 3 and 5, mounted within the peripheral portion 24 of the frame 22 is a secondary filter 70. The secondary filter 70 has its upstream side 72 facing the downstream valleys 46 of the filter media panel members 49 and an downstream side 74 facing toward the interior space 12 of the vehicle 10 when the filter element 20 is used to filter cabin air (See FIG. 1). The secondary filter 70 is made of a foamed resin, a non-woven synthetic such as polyester fiber, or a metal mesh or screen. A primary purpose of the secondary filter media 70 is to provide mechanical support for the filter media panel members 49 while filtering out smaller particles. Preferably, the secondary filter 70 is a filter which improves efficiency while the filter media panel members 49 increase filter capacity. Since the secondary filter 70 is used to filter environmental air 16 for enclosures such as a vehicle cabin, it may also include activated carbon to remove chemical pollutants and irritants in the air stream 16. The secondary filter media 70 can be either permanently adhered within a downstream portion 80 of the peripheral rim 24 of frame 22 or can be force fitted or snap fitted within the rim 24 if the secondary filter media is relatively stiff mechanically. In a preferred embodiment of the invention, the secondary filter media is retained in place by an expanded metal screen 78 embedded in the peripheral portion 24 of the frame.

Figure 7:
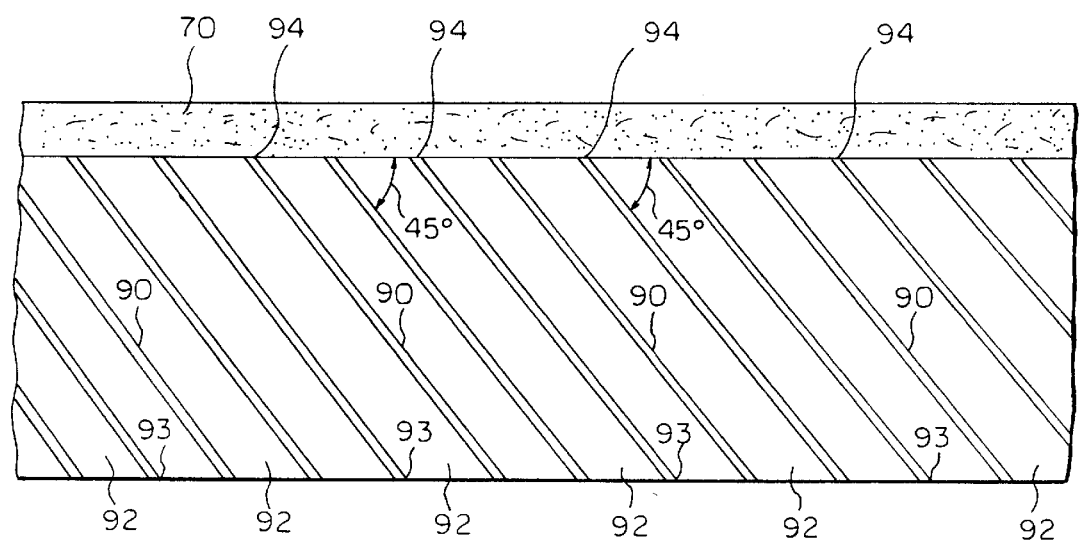
FIG. 7 is a side elevation of another embodiment of a filter media configuration in accordance with the present invention.

Referring now to FIG. 7, there is shown another embodiment of the invention wherein the filter media web of FIGS. 2–5 is replaced by single filter media panels 90 completely separated from one another by spaces 92. The panels 90 are oriented at about 45° with respect to the air stream 16 so that upstream edges 93 overlap downstream edges 94. The filter media may either be made of stiff material or supported by frames such as the frames 42 of FIGS. 2–6.

From the foregoing description, one skilled in the art can easily ascertain the essential characteristics of this invention, and without departing from the spirit and scope thereof, can make various changes and modification of the invention to adapt it to various usages and conditions.

I claim:

1. A filter media configuration for a filter element having a frame, wherein the filter media configuration filters a stream of gas moving transversely with respect to an opening in the frame in which a filter media is disposed in order to remove particulates from the stream, the filter media comprising:

an array of filter media panels having upstream and downstream filter media faces defined within first and second ends and upstream and downstream edges;

supports mounting the filter panels in the frame at an angle with respect to the air stream and with a spacing sufficient to overlap the upstream edges of single filter media panels with the downstream edges of an adjacent single filter media panels, whereby air impinging on one filter panel and passing therethrough in the direction of the air stream impinges on and passes through another filter panel before exiting the filter media.

2. The filter media of claim 1 wherein there are gaps between adjacent ones of the filter panels which gaps extend obliquely with respect to the direction of the air stream.

3. The filter media of claim 2 wherein the angle at which the separate panels of the filter media is oriented with respect to the air stream and is about 45°.

4. The filter media of claim 3 wherein the filter media further includes a secondary filter media component disposed downstream of the array of panels.

5. The filter media of claim 4 wherein the secondary component is a mat of filter material which extends substantially perpendicular to the direction of the air stream.

6. The filter media of claim 5 wherein the mat of material is made of foamed resin.

7. The filter media of claim 6 wherein the mat of secondary filter media is a nonwoven synthetic material.

8. The filter media of claim 7 wherein the mat of secondary filter media is a metal mesh.

9. The filter media of claim 1 wherein the filter media further includes a secondary filter media component disposed downstream of the array of panels.

10. The filter media of claim 2 wherein the filter media further includes a secondary filter media component disposed downstream of the array of panels.

11. The filter media of claim 1 wherein the filter media panels are comprised of cellulose.

12. The filter media of claim 1 wherein the filter media panels are comprised of polymer strands.

13. The filter media of claim 1 wherein the filter media is comprised of a metal screen.

14. The filter media configuration of claim 1 wherein the filter media is configured as a continuous web with portions folded over and under adjacent frames to form peaks and valleys with the filter media panels formed between the peaks and valleys.

15. A filter element adapted to filter an air stream flowing in a selected direction comprising:

a frame having an opening therethrough adapted to extend transversely to the direction of the air stream;

a first filter media disposed in the frame, the first filter media comprising an array of filter media panels having upstream and downstream filter media faces defined within first and second ends and upstream and downstream edges; the filter media panels being mounted in the frame at an angle and with a spacing sufficient to overlap the upstream edges single filter media panels with the downstream edges of adjacent single filter media panels whereby air impinging on one filter panel and passing therethrough in the direction of the air stream impinges and passes through another filter panel before exiting the filter media; and a second filter media mounted by the frame downstream of the first filter media.

16. The filter element of claim 15 wherein the second filter media is a mat of filter material extending transverse to the direction of the air stream.

17. The filter element of claim 16 wherein the second filter media is made of a framed material.

18. The filter element of claim 16 wherein the second filter media is made of a non-woven synthetic material.

19. The filter media of claim 16 wherein the second filter media is a metal mesh.

20. The filter element of claim 19 wherein the first filter media is made of a metal screen or a metal mesh whereby the filter element is cleanable and reusable.

21. The filter element of claim 15 wherein the first filter media is made of cellulose or synthetic resin.

22. The filter element of claim 15 wherein the filter media panels are oriented at an angle of about 45° to the direction of the air stream.

23. The filter element of claim 15 wherein the filter media is configured as a continuous web with portions folded over and under adjacent frames to form peaks and valleys with the filter media panels formed between the peaks and valleys.

* * * * *